United States Patent Office.

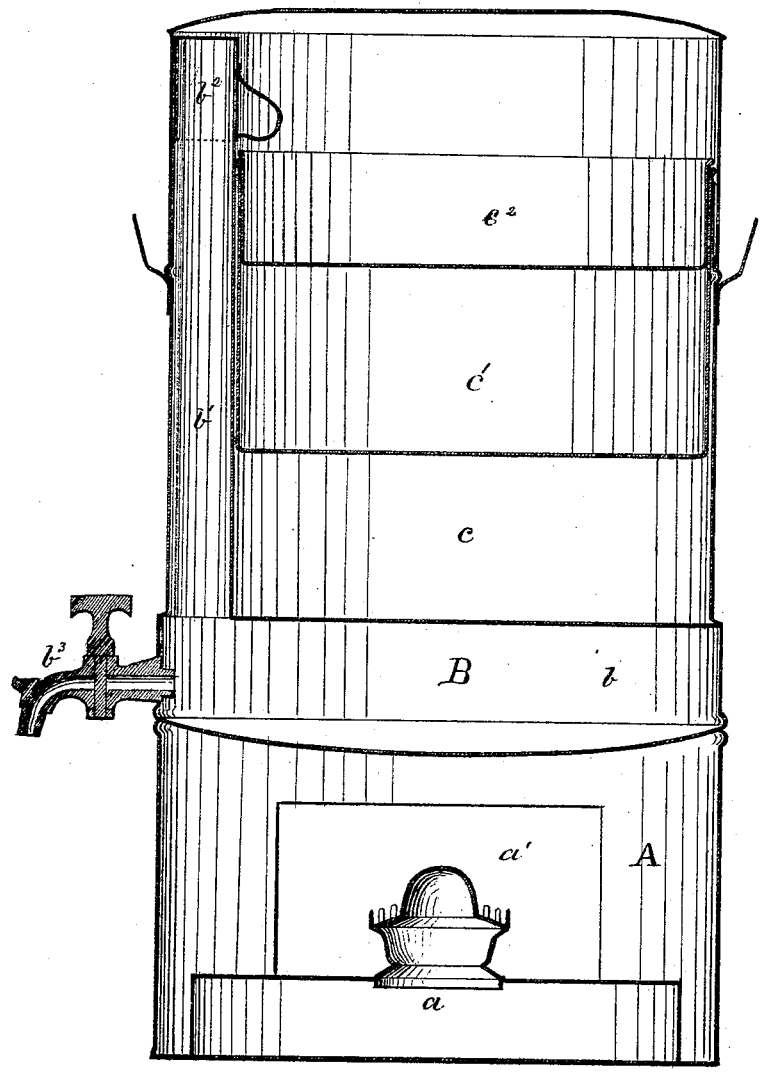

NELSON C. BURNAP, OF ARGUSVILLE, NEW YORK.

Letters Patent No. 103,558, dated May 31, 1870.

IMPROVED DINNER-PAIL AND LANTERN.

The Schedule referred to in these Letters Patent and making part of the same.

*To all whom it may concern:*

Be it known that I, NELSON C. BURNAP, of Argusville, in the county of Schoharie and in the State of New York, have invented a new and useful Improvement in Combined Dinner-Pail and Lantern; and do hereby declare that the following description, taken in connection with the accompanying plate of drawings hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to a household utensil which may be used as a dinner-pail, lantern, and heater, and the nature thereof consists in a novel arrangement of the parts of the same, hereinafter described and shown.

In the accompanying plate of drawings which illustrate my invention, and form a part of the specification thereof, in which corresponding parts are illustrated by similar letters—

Figure 1 represents a transverse vertical section, showing the arrangement of the parts of which the utensil is composed.

The construction, operation, and relative arrangement of the component parts of my invention are as follows, to wit:

The lower chamber A contains a lamp, $a$, and is provided with windows $a'$, covered with isinglass or other transparent media.

Upon the said lower chamber rests the upper chamber B, the lower compartment $b$ of which is intended to hold liquid substances, and provided with the funnel $b'$, which extends upward to the top of the utensil, and is capped by the dipper $b^2$, fitting closely upon its top.

The compartment $b$ is also provided with a stop-cock, $b^3$, by means of which the liquid which it contains may be readily drawn off.

The compartment $c$ of the upper chamber is intended to hold edibles, and is provided with cylindrical receptacles $c^1$ and $c^2$, fitting closely within the same.

The operation and uses of the utensil are evident, from the foregoing description of the construction and arrangement of the parts thereof.

Having thus described the construction and operation of my invention, I will indicate what I claim and desire to secure by Letters Patent in the following clause:

A utensil combining the functions of a lantern, dinner-pail and heating apparatus, consisting of the lower chamber A, provided with the lamp $a$, and windows $a'$, and upper chamber B, provided with the compartment $b$, funnel $b^1$, cap-dipper $b^2$, stop-cock $b^3$, and receptacles $c$, $c^1$, $c^2$, when combined, arranged and operating together as described.

In testimony that I claim the foregoing, I have hereunto set my hand and seal this          day of     , 1870.

N. C. BURNAP.

Witnesses:
   SCHUYLER GORDON,
   CHARLES TCHERS.